Sept. 20, 1966 R. E. THOMA, JR., ET AL 3,273,973
METHOD FOR PROCESSING ALUMINUM-CONTAINING NUCLEAR FUELS
Filed March 31, 1964 2 Sheets-Sheet 2

INVENTORS.
Roy E. Thoma Jr.
Melvin R. Bennett
Jacob W. Ullmann

BY Roland G. Anderson
ATTORNEY.

United States Patent Office 3,273,973
Patented Sept. 20, 1966

3,273,973
METHOD FOR PROCESSING ALUMINUM-CONTAINING NUCLEAR FUELS
Roy E. Thoma, Jr., Melvin R. Bennett, and Jacob W. Ullmann, Oak Ridge, Tenn., assignors to the United States of America as represented by the United States Atomic Energy Commission
Filed Mar. 31, 1964, Ser. No. 356,338
10 Claims. (Cl. 23—324)

The present invention relates, generally, to methods for reprocessing spent nuclear fuels and more particularly to processes wherein such fuels are contacted with a molten salt solvent especially suited for the dissolution of aluminum-containing nuclear fuels.

Heretofore, dissolution of aluminum-containing nuclear fuels, has generally, been directed toward aqueous dissolution methods where the fuel material, such as uranium, plutonium, and other useful materials, was dissolved in strong aqueous acids, extracted with an organic solvent and subsequently separated and recovered. Equally applicable, where the fuels were clad with aluminum, was a reprocessing operation in which the cladding was first dissolved with a caustic solution of sodium hydroxide and sodium nitrate, and then the fuel core was dissolved and the fuel values separated and recovered as above. Also, where the cladding is not bonded to the fuel core the cladding may be mechanically removed and the fuel core dissolved as above.

While certain molten salt solvents have generally proven suitable for dissolving spent nuclear fuels clad with zirconium, they have not appeared too attractive for aluminum-containing dissolution processes due to the highly developed and highly suitable aqueous dissolution processes. This is especially true when evaluated in light of the potential corrosion problem of the dissolver vessel under operating conditions. While these salts are not intrinsically corrosive, by the addition of hydrogen fluoride to the system at elevated temperatures corrosive attack on the vessel metals becomes a problem. With the advent of an increased number of aluminum-containing fuels, it is desirable to find a suitable molten salt solvent for the dissolution of these types of nuclear fuels.

It is, therefore, a general object of the present invention to provide a method for the dissolution of aluminum-containing nuclear fuels.

Another object is to provide a molten fluoride salt solvent which is suitable for the dissolution of aluminum-containing spent nuclear fuel.

Still another object is to provide a molten fluoride salt solvent which is capable of retaining sizeable concentrations of aluminum fluoride in the liquid state at temperatures below 600° C.

A further object is to provide a molten fluoride salt solvent at a reasonable cost which will be compatible with existing fluoride volatility facilities.

Another object is to provide a process involving a molten fluoride salt solvent which will effect dissolution of aluminum-containing spent nuclear fuels but will not interfere with subsequent recovery of the nuclear fuel values by a fluoride volatility process.

Other objects and advantages will become apparent as the description proceeds.

Figure 1:
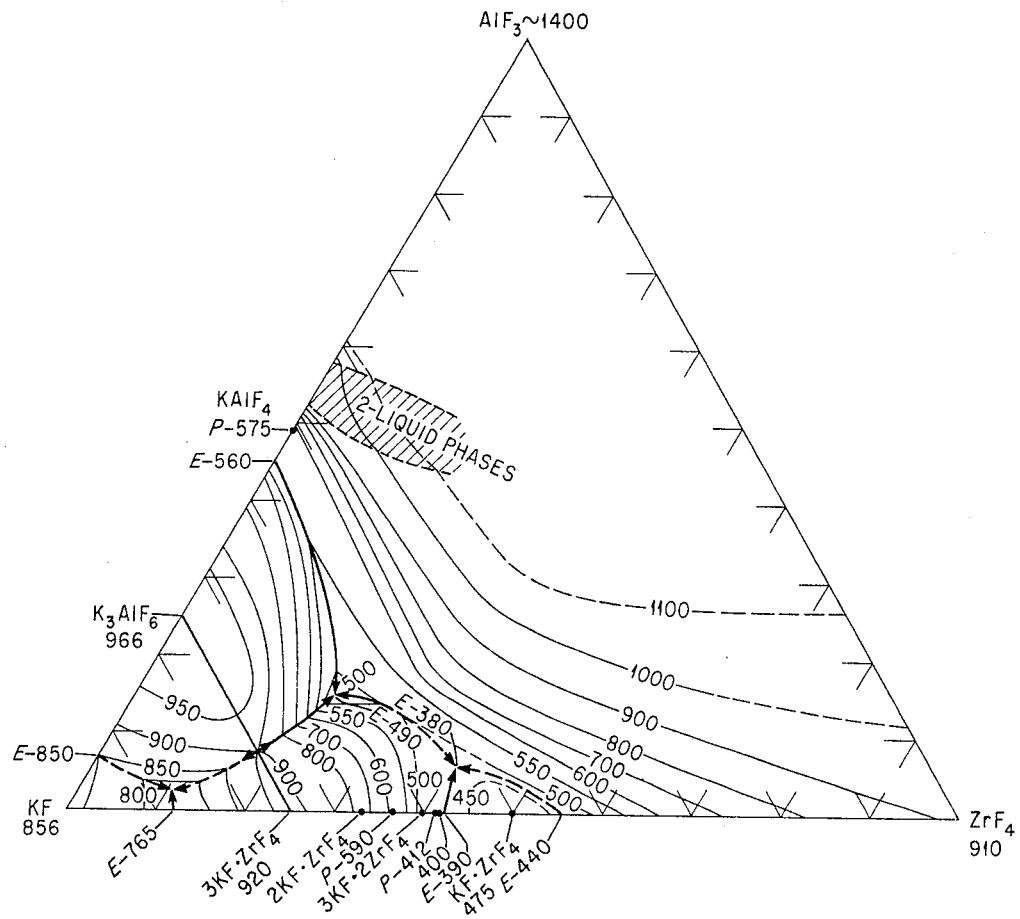
FIGURE 1 is the phase diagram for the ternary system $KF$-$ZrF_4$-$AlF_3$.

In accordance with the present invention there is provided a method for the dissolution of aluminum-containing nuclear fuels by contacting the nuclear fuel with a molten salt solvent of $KF$-$ZrF_4$ at a temperature no greater than 658° C. while passing anhydrous hydrogen fluoride through the mixture. Dissolution rates of 50 mils/hr. along with maximum capacity of 35 mole percent aluminum fluoride were obtained with this method.

In practicing the invention, applicants have found various operating parameters which are preferred. The dissolution should be carried out at a temperature below the melting point of aluminum which is 658° C. However, it will be appreciated that the dissolution could be carried out at a temperature above the melting point of the aluminum, but due to the higher temperature, increased corrosion, and the desirability of precluding the formation of any molten aluminum metal in the system, the dissolution temperature should not exceed the melting point and preferably not exceed 600° C.; the latter temperature is to insure a margin between the operating temperature and the melting point of aluminum.

As a preliminary step to the dissolution operation, the salt mixture should be treated by bubbling anhydrous hydrogen fluoride through the melt during the heating step. This serves to drive off any oxides and moisture present and also to saturate the salt mixture with hydrogen fluoride prior to the dissolution operation. Further, continued sparging of the molten salt solvent with anhydrous hydrogen fluoride during dissolution has been found to be essential to achieving high dissolution rates. While applicants do not wish to be bound by any particular theory as to the mechanism by which the dissolution proceeds, it is thought that the predominating reaction taking place in the molten salt is between the aluminum metal and $ZrF_4$. This dissolution proceeds partly by hydrofluorination and partly by a metathesis-type reaction with the $ZrF_4$, as represented by the reactions:

(1) $2Al + 6HF \rightarrow 2AlF_3 + 3H_2$
(2) $4Al + 3ZrF_4 \rightarrow 4AlF_3 + 3Zr$ (amorphous)

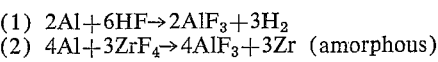

Although the second reaction is probably correct, it has not been completely confirmed, since the amorphous product is difficult to separate and analyze in the salt matrix. In addition the amorphous material could possibly be a ZrAl alloy or $ZrH_x$; in any case, continued hydrofluorination of the salt results in complete dissolution of all material, including the amorphous material. Although the $ZrF_4$ reduction appears to be an important factor in obtaining a high dissolution rate, the concurrent reaction of aluminum with HF is necessary to catalyze the $ZrF_4$ reaction, possibly by keeping the surface of the aluminum reactive. Although not critical, the flow rate of the HF through the melt should be of a sufficient rate to allow the dissolution to proceed at a rapid rate. Applicants have found that a flow rate of about 100 cc./min. afforded suitable dissolution rates and therefore is greatly preferred.

Due to the corrosive nature of the molten fluoride salt under operating conditions, the dissolver should be constructed of a structural material which has good corrosion resistance to such salts. On a laboratory scale, applicants have found nickel to be suitable and for plant-scale operations nickel-base alloys, such as INOR–8, have been quite adequate. Inasmuch as the fuel values are dissolved in the melt, it will be appreciated that the dissolver should be designed to avoid a criticality incident. For laboratory scale operation, a cylindrical dissolver vessel (5″ I.D. diameter by 8′ long) has been suitable.

Referring to the phase diagram as shown in FIG. 1, it will be seen that, when operating at a maximum dissolution temperature of 600° C. (area bound by the 600° C. isotherm), various fluoride salt compositions may be used.

Selection of a particular salt composition to carry out the dissolution may depend upon a number of factors, such as (1) cost of salt per unit of fuel value processed, and (2) operability of the salt system. Inasmuch as the constituents of the binary systems KF-ZrF$_4$ vary considerably in their cost ($4.00/lb. for ZrF$_4$ vs. $0.37/lb. for KF) it is preferred that the dissolution be carried out with a KF rich salt solvent. In passing, it may be noted that, where the salt composition has greater than 65 mole percent KF, small amounts of aluminum fluoride have to be added to the melt to lower the eutectic temperature of the salt mixture below the melting temperature of the aluminum and from an economic standpoint alone, may offset the benefits gained by going to the cheaper salt. Thus, from a cost standpoint it may be desirable to carry out the dissolution with a KF rich salt mixture having KF composition less than 65 mole percent.

In selecting the most operable binary salt solvent the salt composition must not only have a high capacity for aluminum fluoride in the liquid state at the highest operating dissolution temperature but also must provide a suitable rate of dissolution. In carrying out the dissolution it will be apparent that the salt composition used should be capable of retaining a large quantity of aluminum in solution. Thus, it may be seen from FIG. 1 that those salt compositions which have low capacities for dissolved aluminum, as for example those salt compositions having greater than 50 mole percent ZrF$_4$, are generally not suitable for use as salt solvents. Hence, the salt compositions which are in the KF rich portion of the phase diagram are highly preferred not only because of the low cost but also for their high capacity for dissolved aluminum.

Figure 2:
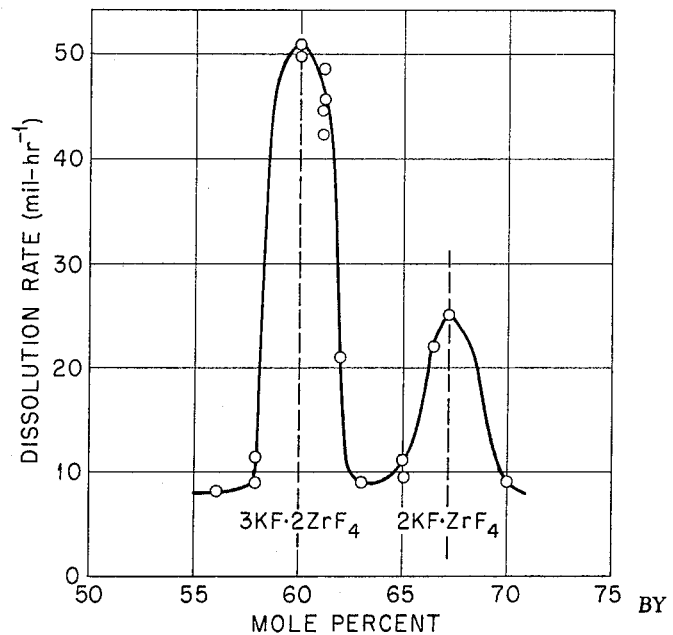
FIGURE 2 shows aluminum dissolution rate as a function of salt composition for the system $KF$-$ZrF_4$.

While the salt capacity for aluminum fluoride may be obtained from the phase diagram, the rates of dissolution for any given salt composition cannot be derived from the phase diagram, but must be obtained by conducting dissolution studies for the various salt compositions. Upon investigating the dissolution rates of the various salt compositions applicants found that a particular range of salt compositions, namely those salts having a composition ranging from 59 to 61 mole percent KF and 39 to 41 mole percent ZrF$_4$, gave, quite unexpectedly, a substantial increase in the dissolution rates. Referring to FIG. 2 it may be seen that when these salt compositions were used, dissolution rates as high as 50 mils./hr. were obtained, whereas when other salt compositions were used, dissolution rates ranged from about 10 mils./hr. to 25 mils./hr. There is nothing which would suggest, from an examination of the phase diagram for the binary system KF-ZrF$_4$, that a slight change in salt composition from, for example, 67KF-33ZrF$_4$ (mole percent) to 61KF39ZrF$_4$ (mole percent) would provide such a substantial increase in the dissolution rates.

While it is important that the molten salt solvent effect complete dissolution of the fuel elements at a high dissolution rate, it is equally important that the molten salt solvent be compatible with subsequent steps to recover and purify the therein-contained dissolved fuel values. The present development may be integrated with an already existing fluoride volatility process for the recovery of fuel values from molten salt systems which was developed in conjunction with earlier dissolution work on zirconium-containing nuclear fuels. There, the fuel value, such as uranium, was converted to the soluble uranium tetrafluoride (UF$_4$) and upon completion of the dissolution step, the uranium tetrafluoride was further oxidized to volatile uranium hexafluoride by contacting it with elemental fluorine. Thereafter the volatilized uranium hexafluoride product was purified by an adsorption-desorption cycle on sodium fluoride pellets and was collected in cold traps. Fluorination tests using the present molten salt solvent containing dissolved uranium values demonstrated that better than 99% of the uranium could be recovered from the melt.

Figure 3:
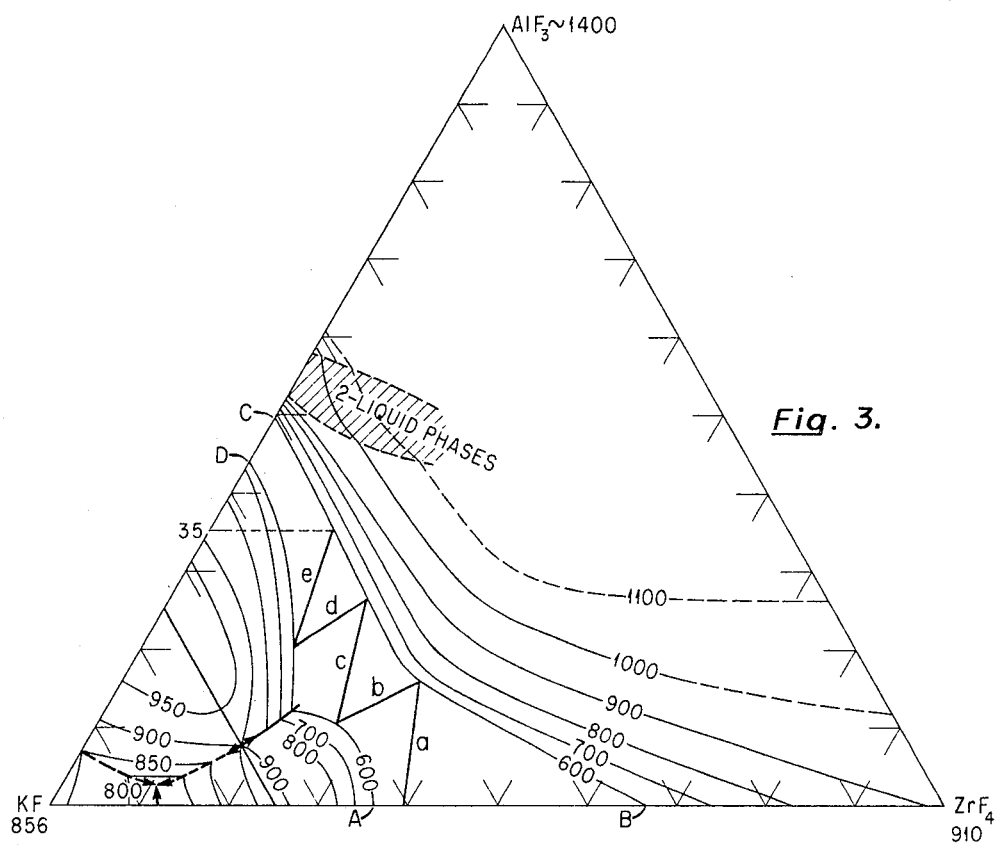
FIGURE 3 is a portion of the phase diagram of FIGURE 1 with the isotherm lines below 600° C. removed so that a preferred method of carrying out the invention may clearly be shown. Area ABCD is the area bound by the 600° C. isotherm of FIGURE 1.

A preferred method of carrying out the invention will be hereinafter described in detail. A molten fluoride salt solvent comprising 61 mole percent KF–39 mole percent ZrF$_4$ was heated to 600° C. and treated by bubbling anhydrous hydrogen fluoride through the melt. An aluminum-uranium alloy fuel element was then immersed in the molten solvent, and referring to FIG. 3, dissolution was allowed to progress until about 15 mole percent AlF$_3$ (as shown by line a) without exceeding the temperature limit of 600° C. The capacity for holding dissolved aluminum was then increased by the addition of KF to the melt to change the composition to ~62–26–12 KF-ZrF$_4$-AlF$_3$ (as indicated by line b). At this point additional aluminum was dissolved (as shown by line c) until a composition of ~52–22–25 KF-ZrF$_4$-AlF$_3$ (mole percent) was reached. Finally, additional KF was added to the melt to change the composition (as shown by line d) to ~62–18–20 KF-ZrF$_4$-AlF$_3$ (mole percent) and additional aluminum dissolved (as shown by line e) until a final composition of ~51–14–35 KF-ZrF$_4$-AlF$_3$ (mole percent) was reached. In this manner applicants have found that not only are excellent dissolution rates achieved but the ultimate capacity of the molten salt solvent was significantly increased.

Further illustration of the quantitative aspects and procedures of the present invention is provided in the following examples. Example I describes the basic procedure and technique used in preparing the molten fluoride salt bath and determining the dissolution rates for the system 67KF-33ZrF$_4$ (mole percent).

EXAMPLE I

A molten fluoride salt bath was prepared by adding approximately 70 grams of 67–33 KF-ZrF$_4$ (mole percent) salt mixture to a cylindrical, nickel reactor vessel, 1 inch by 8 inches long, and heating the contents to a temperature of 600° C. while bubbling anhydrous hydrogen fluoride through the melt to remove any moisture and oxides present and to saturate the salt. For this binary composition it was found necessary to add a small amount of aluminum fluoride to the salt mixture to lower the eutectic temperature (~750° C.) of the mixture below the melting point of aluminum (658° C.). In addition, varying amounts of aluminum fluoride were added to the individual runs in order to determine the dissolution rates at various degrees of saturation.

An aluminum test coupon, 0.312 inch diameter by 1 inch long, was suspended in the melt on a nickel rod while anhydrous hydrogen fluoride was bubbled through the melt at the rate of 100 cc./min. The coupon was checked periodically to determine the rate of dissolution by weight loss and by dimensional changes as indicated by micrometer measurements. Results of the four runs are shown in Table I.

Table I

DISSOLUTION RATES FOR ALUMINUM IN 67 KF-33ZRF$_4$

| Run | Temperature, °C. | AlF$_3$ Content (wt. percent) | Rate according to— | |
|---|---|---|---|---|
| | | | Wt. Loss | Micrometer |
| 1 | 600 | 5 | 12.3 | 10.0–10.5 |
| 2 | 600 | 15 | 6.0 | 6.5–7.0 |
| 3 | 600 | 25 | 2.4 | 3.0–3.5 |
| 4 | 600 | 35 | 1.7 | 1.5–2.0 |

It will be noted that the decreasing rates of dissolution are typical for such processes and are generally attributed to the increase in viscosity at the higher aluminum fluoride concentrations, accompanied by a decrease in hydrogen fluoride soluability. The capacity for aluminum fluoride was found to be about 26 mole percent.

Example II shows the rates of dissolution for various salt compositions.

EXAMPLE II

The same procedure employed in Example I was used to prepare various molten salt baths having salt compositions ranging from 58KF-42ZrF$_4$ to 70KF-30ZrF$_4$ (mole percent) and the same technique was used to determine the respective rates of dissolution. Again, when the salt composition had a KF content greater than 65 mole percent, a small amount of aluminum fluoride was added to the melt to reduce the eutectic temperature below the melting temperature of aluminum.

Results of the various runs are shown in Table II and are illustrated graphically in FIG. 2.

*Table II*

DISSOLUTION RATES FOR ALUMINUM IN KF-ZrF$_4$ MELTS

| Temperature, °C. | Original Salt Composition,[1] mole percent | | | Rate mils/hr. According to— | |
|---|---|---|---|---|---|
| | KF | ZrF$_4$ | AlF$_3$ | Wt. Loss | Micrometer Measurement |
| 600 | 58 | 42 | 0 | 7.9 | 8–9 |
| 595 | 58 | 42 | 0 | 11.7 | 10.5–12 |
| 600 | 60 | 40 | 0 | 51.2 | 46–50 |
| 600 | 61 | 39 | 0 | 48.8 | 55 |
| 600 | 61 | 39 | 0 | 45.8 | 42–47 |
| 590 | 61 | 39 | 0 | 52.7 | 42 |
| 590 | 61 | 39 | 0 | 52 | |
| 590 | 61 | 39 | 0 | 38.7 | 41–43 |
| 600 | 62 | 38 | 0 | 21.2 | 18–21 |
| 600 | 63 | 37 | 0 | 8.8 | 8–10 |
| 600 | 65 | 35 | 4 | 11.1 | 9–10 |
| 600 | 66 | 33 | 5 | 21.7 | 18–22 |
| 600 | 67 | 33 | 7 | 25.6 | 21.24 |
| 595 | 68 | 32 | --- | 12.3 | 10–10.5 |

[1] Exclusive of AlF$_3$ content.

The results in Table II show the excellent dissolution rates were increased by a factor of from 2 to 5 over those rates that were obtained with the KF-ZrF$_4$ binary salt mixture, which had a composition ranging from 59 to 61 mole percent KF and 39 to 41 mole percent ZrF$_4$. Dissolution obtained with other compositions. The capacity for aluminum fluoride was found to be about 15 mole percent.

Example III demonstrates the applicability of the present salt solvent in dissolving aluminum-uranium alloy fuel elements and also the integration of such a process with a fuel separation and recovery process. It further illustrates a preferred method of carrying out the invention which affords maximum aluminum fluoride capacity.

EXAMPLE III

The same procedure employed in Example I was used to prepare a molten salt bath of 61–39 KF-ZrF$_4$ (mole percent) salt mixture.

Two aluminum-uranium alloy plates (¼" x ⁵⁄₁₆" x 0.005"), which contained approximately 3.6 wt. percent uranium, were immersed in the salt bath while passing anhydrous hydrogen fluoride at a flow rate of approximately 100 cc./min. through the melt. In order to maintain a melt temperature in the vicinity of 600° C., it was necessary, when the aluminum fluoride composition reached 15 mole percent and 26 mole percent, respectively, to add KF to the melt; thus, increasing the salt capacity for holding dissolved aluminum. In this manner a salt mixture having a final aluminum fluoride composition of approximately 35 mole percent was obtained.

The dissolved uranium was subsequently removed from the melt by passing fluorine gas through the melt, which was maintained at a temperature of 575° C. at a flow rate of 100 cc./min. for about 1½ hours to convert the uranium tetrafluoride to the volatile uranium hexafluoride. The uranium hexafluoride product was then cooled to a temperature of about 100° C. and absorbed on a bed of sodium fluoride pellets to separate the fuel value from its fission products. Then the temperature of the bed was raised to a temperature of about 400° C. to remove the absorbed uranium hexafluoride to further decontaminate the fuel value from its fission products. The purified uranium hexafluoride product was subsequently collected in colt traps. The results are shown in Table III.

*Table III*

DISSOLUTION OF Al-U ALLOY SPECIMENS IN KF-ZrF$_4$ WITH HF

| | Run No. 1 |
|---|---|
| Phase I: | |
| Specimen dimensions, in. | 2¼ x ⁵⁄₁₆ x .050. |
| Sample weight, g. (est. 3.6 wt. percent U) | 3.17. |
| Salt weight, g. | 67.9. |
| Salt composition, mole percent KF-ZrF$_4$ | 61–39. |
| Salt temperature, °C. | 600. |
| HF flow, cc. min.⁻¹ | ~100. |
| AlF$_3$ conc., mole percent (end of Phase I) | 15.2. |
| Final salt composition, mole percent KF-ZrF$_4$-AlF$_3$-UF$_4$. | 52.19–33.28–14.47–.06. |
| Phase II: | |
| KF added to melt, g | 12.8. |
| Salt composition, mole percent KF-ZrF$_4$-AlF$_3$-UF$_4$. | 62.29–26.08–11.28–0.5. |
| Specimen weight, g | 5.26. |
| Final salt composition, mole percent KF-ZrF$_4$-AlF$_3$-UF$_4$. | 52.76–21.92–25.22–0.1. |
| Phase III: | |
| KF added to melt, g | 13.9. |
| Salt composition, mole percent KF-ZrF$_4$-AlF$_3$-UF$_4$. | 62.0–17.5–20.5–0.08. |
| Specimen weight, g | 6.13. |
| Final salt composition, mole percent KF-ZrF$_4$-AlF$_3$-UF$_4$. | 50.8–14.0–35.0. |

RECOVERY OF U AS UF$_6$ BY VOLATILIZATION WITH F$_2$ GAS

| | |
|---|---|
| Phase IV: | |
| Temperature, °C. | 575. |
| F$_2$ flow rate, cc. min.⁻¹ | ~100. |
| U recovered, percent | 99.4. |

What is claimed is:

1. A method for the dissolution of aluminum-containing nuclear fuels comprising the step of contacting said fuels with a molten fluoride salt solvent of KF-ZrF$_4$ at a temperature no greater than 658° C. while passing anhydrous hydrogen fluoride through the melt.

2. A method for the dissolution of aluminum-containing nuclear fuels comprising the step of contacting said fuels with a molten fluoride salt solvent consisting of 59 to 61 mole percent KF and 39 to 41 mole percent ZrF$_4$ at a temperature of about 600° C. while passing anhydrous hydrogen fluoride through the melt.

3. The method of claim 2 wherein said molten salt solvent consists of 61 mole percent KF and 39 mole percent ZrF$_4$.

4. A method for processing aluminum-containing nuclear fuels comprising the step of dissolving said fuels with a molten fluoride salt solvent having a composition essentially within the area ABCD of FIG. 3 at a temperature no greater than 600° C. to form a melt while passing anhydrous hydrogen fluoride through said melt, said dissolving being effected by the interittent addition of KF to said melt to thereby maintain a melt temperature below 600° C. and to increase the capacity for dissolved AlF$_3$ of said salt solvent.

5. The method of claim 4 wherein said molten fluoride salt solvent has an initial composition consisting of 59 to 61 mole percent KF and 39 to 41 mole percent ZrF$_4$.

6. The method of claim 5 wherein said molten fluoride salt solvent consists of 61 mole percent KF and 39 mole percent ZrF$_4$.

7. A method for the separation and recovery of fuel values from aluminum-containing nuclear fuels containing said fuel values and fission products therein comprising the steps of dissolving said fuels in a molten fluoride salt solvent of KF-ZrF$_4$ at a temperature no greater than 658° C. to form a melt while passing anhydrous hydrogen fluoride through said melt, then passing fluorine gas through said melt while maintaining the temperature of said melt between 500–600° C. to thereby convert said dissolved fuel values to the volatile hexafluoride and thereafter separately recovering said volatilized hexafluoride product.

8. The method of claim 7 wherein said nuclear fuel values consist of uranium and plutonium and said salt solvent consists of 61 mole percent KF and 39 mole percent $ZrF_4$.

9. The method of claim 8 wherein said fuel value consists of uranium.

10. The method of claim 7 wherein said nuclear fuel value is uranium and said recovery is effected by cooling the volatilized uranium hexafluoride product to a temperature of about 100° C., absorbing said cooled product on a bed of sodium fluoride pellets to separate said fuel value from its fission products, raising the temperature of said bed to a temperature of about 400° C. to remove said uranium hexafluoride from said bed thereby further decontaminating said fuel value from its fission products and thereafter recovering said purified uranium hexafluoride product.

References Cited by the Examiner

Reactor Fuel Processing, vol. 7, No. 3, Division of Technical Information, U.S.A.E.C., pp. 183–186.

BENJAMIN R. PADGETT, *Primary Examiner.*

S. TRAUB, *Assistant Examiner.*